United States Patent
Hwang

(10) Patent No.: US 12,271,965 B2
(45) Date of Patent: Apr. 8, 2025

(54) METHOD FOR ORDERING AND DELIVERING FOOD BY USING AUTONOMOUS VEHICLE, AND SYSTEM USING SAME

(71) Applicant: XYZ, Inc., Seoul (KR)

(72) Inventor: Sung Jae Hwang, Seongnam-si (KR)

(73) Assignee: XYZ, Inc., Seoul (KR)

( * ) Notice: Subject to any disclaimer, the term of this patent is extended or adjusted under 35 U.S.C. 154(b) by 456 days.

(21) Appl. No.: 17/544,095

(22) Filed: Dec. 7, 2021

(65) Prior Publication Data

US 2022/0101459 A1    Mar. 31, 2022

Related U.S. Application Data

(63) Continuation of application No. PCT/KR2021/003067, filed on Mar. 12, 2021.

(30) Foreign Application Priority Data

Mar. 17, 2020    (KR) .................. 10-2020-0032421

(51) Int. Cl.
*G06Q 50/12* (2012.01)
*A23L 5/10* (2016.01)
(Continued)

(52) U.S. Cl.
CPC .............. *G06Q 50/12* (2013.01); *A23L 5/10* (2016.08); *A47J 44/00* (2013.01); *B25J 9/1664* (2013.01);
(Continued)

(58) Field of Classification Search
CPC ........ G06Q 50/12; G06Q 20/22; G06Q 20/18; G06Q 20/308; G06Q 20/40155;
(Continued)

(56) References Cited

U.S. PATENT DOCUMENTS 10,304,147 B2 *  5/2019  Kelly ................ G07F 11/48
10,332,065 B2 *  6/2019  Ferguson .......... G06Q 20/00
(Continued)

FOREIGN PATENT DOCUMENTS

CN    206174526 U    5/2017
CN    107452143 A    12/2017
(Continued)

OTHER PUBLICATIONS

Shaklab et al. "Towards Autonomous and Safe Last-mile Deliveries with AI-augmented Self-driving Delivery Robots", May 28, 2023, arXiv:2305.17705, Cornell University. (Year: 2023).*
(Continued)

*Primary Examiner* — Peter Ludwig
*Assistant Examiner* — Jessica E Sullivan
(74) *Attorney, Agent, or Firm* — Dinsmore & Shohl LLP; Yongsok Choi, Esq.

(57) ABSTRACT

According to an embodiment of the present invention, there is provided a system for ordering and delivering food using an autonomous vehicle, the system including: an autonomous vehicle configured to request a food order by a user; a server configured to receive information about the food order by the user; and an unmanned food station configured to prepare food based on the information about the food order and to deliver the prepared food into the autonomous vehicle when the autonomous vehicle arrives; wherein the server is configured to determine an unmanned food station to prepare food based on the location of the autonomous vehicle.

20 Claims, 7 Drawing Sheets

(51) Int. Cl.
*A47J 44/00* (2006.01)
*B25J 9/16* (2006.01)
*B60W 60/00* (2020.01)
*G05D 1/00* (2024.01)
*G06Q 20/22* (2012.01)

(52) U.S. Cl.
CPC ..... *B60W 60/00256* (2020.02); *G05D 1/0011* (2013.01); *G06Q 20/22* (2013.01); *A23V 2002/00* (2013.01)

(58) Field of Classification Search
CPC .... G06Q 30/06; G06Q 50/10; G06Q 30/0633; A23L 5/10; A47J 44/00; B25J 9/1664; B25J 11/00; B25J 11/0045; B25J 11/008; B60W 60/00256; B60W 40/02; B60W 40/08; B60W 50/14; B60W 2040/0881; B60W 2050/0064; B60W 2050/146; B60W 2420/403; G05D 1/0011; G05D 1/0297; A23V 2002/00; G07F 9/001; G07F 17/0064; G08G 1/202
See application file for complete search history.

(56) References Cited

U.S. PATENT DOCUMENTS

| | | | |
|---|---|---|---|
| 2014/0136414 A1 | 5/2014 | Abhyanker | |
| 2019/0049988 A1* | 2/2019 | Meij | G06Q 10/08 |
| 2019/0310611 A1* | 10/2019 | Jain | B25J 9/161 |
| 2020/0070717 A1* | 3/2020 | Garden | G06V 20/56 |
| 2020/0167722 A1* | 5/2020 | Goldberg | G08G 5/003 |
| 2022/0237713 A1* | 7/2022 | Rosas-Maxemin | G06Q 20/12 |
| 2023/0090442 A1* | 3/2023 | Gruebele | A47J 44/00 |
| | | | 426/231 |

FOREIGN PATENT DOCUMENTS

| | | | |
|---|---|---|---|
| JP | 2020-7148 A | | 1/2020 |
| JP | 2020007148 A | * | 1/2020 |
| KR | 10-2016-0135069 A | | 11/2016 |
| KR | 10-2019-0092337 A | | 8/2019 |
| KR | 10-2019-0104943 A | | 9/2019 |

OTHER PUBLICATIONS

International Search Report for PCT/KR2021/003067 dated, Aug. 23, 2021 (PCT/ISA/210).

* cited by examiner

METHOD FOR ORDERING AND DELIVERING FOOD BY USING AUTONOMOUS VEHICLE, AND SYSTEM USING SAME

TECHNICAL FIELD

The present invention relates to a method that orders and delivers food by using an autonomous vehicle and a system that orders and delivers food by using the method. More particularly, the present invention relates to a method and system that can efficiently and safely deliver food and beverage products by using an autonomous vehicle and a food delivery robot.

BACKGROUND ART

An autonomous vehicle refers to a vehicle that can operate on its own without the operation of a driver or a passenger, and an autonomous driving system refers to a system that monitors and controls an autonomous vehicle so that it can operate on its own. With the recent development of autonomous vehicle technology, in the near future, it will be possible for a vehicle to arrive at a desired destination without a driver and automatically move to a location desired by a user.

Furthermore, as robot technology develops, a technology in which an unmanned robot prepares a beverage or a dish and delivers it is being developed. By using a robot to perform tasks ranging from food preparation to serving, manpower can be reduced, and cooking can be performed faster and more accurately. In the future, it is expected that unmanned restaurants and cafes, which are different from the existing ones, will be gradually activated by implementing all cooking, serving, and ordering processes through an unmanned system.

Therefore, there is a need for a new method and system for ordering and delivering food using an autonomous vehicle.

DISCLOSURE

Technical Problem

An object of the present invention is to provide a method and system that order and deliver food by using an autonomous vehicle and an unmanned food station.

Another object of the present invention is to provide a method and system that enable a user to receive food and a beverage more safely and efficiently by ordering and delivering food through an autonomous vehicle.

Another object of the present invention is to provide a food delivery system that can solve temporal and spatial constraints on a user by preparing and delivering food according to the schedule of the user through an autonomous vehicle without the need for the user to directly move or drive.

Another object of the present invention is to provide a system for ordering and delivering food that can reduce costs of contact with a person by using an unmanned food station and can minimize waiting time and also increase the efficiency of food preparation by cooking food in time for the arrival time of a vehicle.

Another object of the present invention is to provide a method and system that can safely control an autonomous vehicle through communication between the vehicle and an unmanned food station and can deliver prepared food to an accurate destination within the vehicle.

Still another object of the present invention is a method and system that can deliver food to a safe and accurate location according to the intention of a user by identifying window regions of a vehicle, the destination of the food, whether a dedicated food tray is mounted, and whether the user is riding in the vehicle through the image recognition of a service station.

The technical problems to be solved by the present invention are not limited to the above-described technical problems, and other technical problems that have not been described above will be clearly understood by those skilled in the art from the following description.

Technical Solution

According to an embodiment of the present invention, there is provided a method for ordering and delivering food by using an autonomous vehicle, the method including: a food ordering step of requesting a food order by a user from a server; an unmanned food station determination step of determining an unmanned food station that will prepare food; a vehicle movement step of controlling an autonomous vehicle so that it moves to the determined unmanned food station; a food preparation step of preparing, by the unmanned food station, ordered food; and a food delivery step of delivering, by the unmanned food station, the prepared food into the autonomous vehicle.

In this case, the food ordering step includes ordering, by the autonomous vehicle, the food from the server based on food order information received from the user.

The unmanned food station determination step may include determining an unmanned food station closest to the autonomous vehicle.

Furthermore, the unmanned food station determination step may include determining an unmanned food station to prepare food based on at least one of the location of the autonomous vehicle, information related to the user, and the state information of the unmanned food station.

Furthermore, the vehicle movement step may include receiving expected food preparation completion time received from the unmanned food station, and controlling vehicle movement based on the expected food preparation completion time.

Furthermore, the method may further include transmitting expected arrival time for the autonomous vehicle to arrive at the determined unmanned food station to the unmanned food station, and the food preparation step may include preparing the ordered food based on the expected arrival time.

Furthermore, the food preparation step may include determining the cooking start time of the ordered food based on the expected arrival time of the autonomous vehicle and the cooking time of the ordered food.

Furthermore, the method may further include transmitting the location information of a terminal of the user to the server, and the food preparation step may include determining the temperature of the food based on the expected time of the arrival of the food to the user.

Furthermore, the method may further include a vehicle entry step of recognizing that the autonomous vehicle has entered the area of the unmanned food station, the vehicle entry step may include determining, when the autonomous vehicle is located within a predetermined distance from the unmanned food station, that the autonomous vehicle has entered the area of the unmanned food station, and the method may further include a vehicle control step of acquiring the authority to control the movement of the autonomous vehicle in the area of the unmanned food station.

Furthermore, the method may further include a vehicle control step of remotely controlling, by the unmanned food station, the autonomous vehicle, and the vehicle control step may include acquiring the authority to control electric/electronic devices of the autonomous vehicle within the area of the unmanned food station, and opening a window of the autonomous vehicle.

Furthermore, the method may further include a vehicle control step of remotely controlling, by the unmanned food station, the autonomous vehicle, the vehicle control step may include acquiring the authority to control electric/electronic devices of the autonomous vehicle within the area of the unmanned food station, and the food delivery step may further include blocking vehicle control by a driver or passenger of the autonomous vehicle.

Furthermore, the method may further include activating, by the unmanned food station, a camera configured to photograph the autonomous vehicle within the area of the unmanned food station, and the food delivery step may include delivering the prepared food to a destination within the autonomous vehicle determined based on image recognition via the camera.

The food delivery step may include determining the location of a window of the autonomous vehicle, determining whether the window is open, and delivering the ordered food through the open space of the window.

Furthermore, the food delivery step may include determining whether a driver or passenger is present in the autonomous vehicle, and determining the delivery destination of the ordered food based on the location of the driver or passenger.

Furthermore, the food delivery step may include determining the delivery destination of the ordered food based on an attribute of the ordered food.

Furthermore, the food delivery step may include gripping and delivering, by a robot arm included in the unmanned food station, the ordered food.

Furthermore, the method may further include transmitting, by the server, food delivery completion information and payment information after the ordered food has been delivered into the autonomous vehicle.

Furthermore, the method may further include moving, by the autonomous driving vehicle, based on the location of the user after receiving the ordered food.

Furthermore, the method may further include displaying information related to the unmanned food station on the display unit of the autonomous vehicle.

Furthermore, the food preparation step may include changing food cooking speed based on the number of vehicles waiting in the unmanned food station.

According to another embodiment of the present invention, there is provided a system for ordering and delivering food using an autonomous vehicle, the system including: an autonomous vehicle configured to request a food order by a user; a server configured to receive information about the food order by the user; and an unmanned food station configured to prepare food based on the information about the food order and to deliver the prepared food into the autonomous vehicle when the autonomous vehicle arrives; wherein the server is configured to determine an unmanned food station to prepare food based on the location of the autonomous vehicle.

In this case, the unmanned food station may include a vehicle control unit configured to remotely control the autonomous vehicle when the autonomous vehicle arrives.

Advantageous Effects

According to the present invention, there may be provided the method and system that order and deliver food by using the autonomous vehicle and the unmanned food station.

Furthermore, according to the present invention, there may be provided the method and system that enable a user to receive food and a beverage more safely and efficiently by ordering and delivering food through the autonomous vehicle.

Furthermore, according to the present invention, there may be provided the food delivery system that can solve temporal and spatial constraints on a user by preparing and delivering food according to the schedule of the user through the autonomous vehicle without the need for the user to directly move or drive.

Furthermore, according to the present invention, there may be provided the system for ordering and delivering food that can reduce costs of contact with a person by using the unmanned food station and can minimize waiting time and also increase the efficiency of food preparation by cooking food in time for the arrival time of a vehicle.

Furthermore, according to the present invention, there may be provided the method and system that can safely control the autonomous vehicle through communication between the vehicle and the unmanned food station and can deliver prepared food to an accurate destination within the vehicle.

Moreover, according to the present invention, there may be provided the method and system that can deliver food to a safe and accurate location according to the intention of a user by identifying window regions of a vehicle, the destination of the food, whether a dedicated food tray is mounted, and whether the user is riding in the vehicle through the image recognition of the service station.

The effects of the present invention are not limited to the above-described effects, and other effects that have not been described above will be clearly understood by those skilled in the art from the following description.

MODE FOR INVENTION

The present invention will be described in detail below with reference to the accompanying drawings so that those skilled in the art can easily practice the present invention. However, the present invention may be embodied in various different forms and is not limited to the embodiments described herein.

The terms used herein are intended to describe the embodiments and are not intended to limit the present invention. In this specification, a singular form also includes a plural form unless specifically stated otherwise in a phrase.

As used herein, the terms "comprise" and "comprising" do not exclude the presence or addition of one or more components, steps, operations, and/or elements other than one or more mentioned components, steps, operations, and/or elements.

Furthermore, the terms including an ordinal number such as first, second, or the like used herein may be used to describe components, but the components should not be limited by the terms. These terms are used only for the purpose of distinguishing one component from another. Furthermore, in the description of the present invention, when it is determined that a detailed description of a related known technology may obscure the gist of the present invention, the detailed description thereof will be omitted.

Moreover, components appearing in each embodiment of the present invention are shown independently of each other to represent different characteristic functions, and this does not mean that each component is composed of separate hardware or a single software unit. In other words, individual components are listed as respective components for convenience of description. At least two of the individual components may be combined into a single component, or one component may be divided into a plurality of components and perform a function. An embodiment in which some components are combined together and an embodiment in which some components are divided are also included in the scope of the present invention as long as they do not depart from the gist of the present invention.

Embodiments according to the present invention will be described in detail with reference to the accompanying drawings below. The configuration of the present invention and the operating effects thereof will be clearly understood through the following detailed description.

Figure 1:
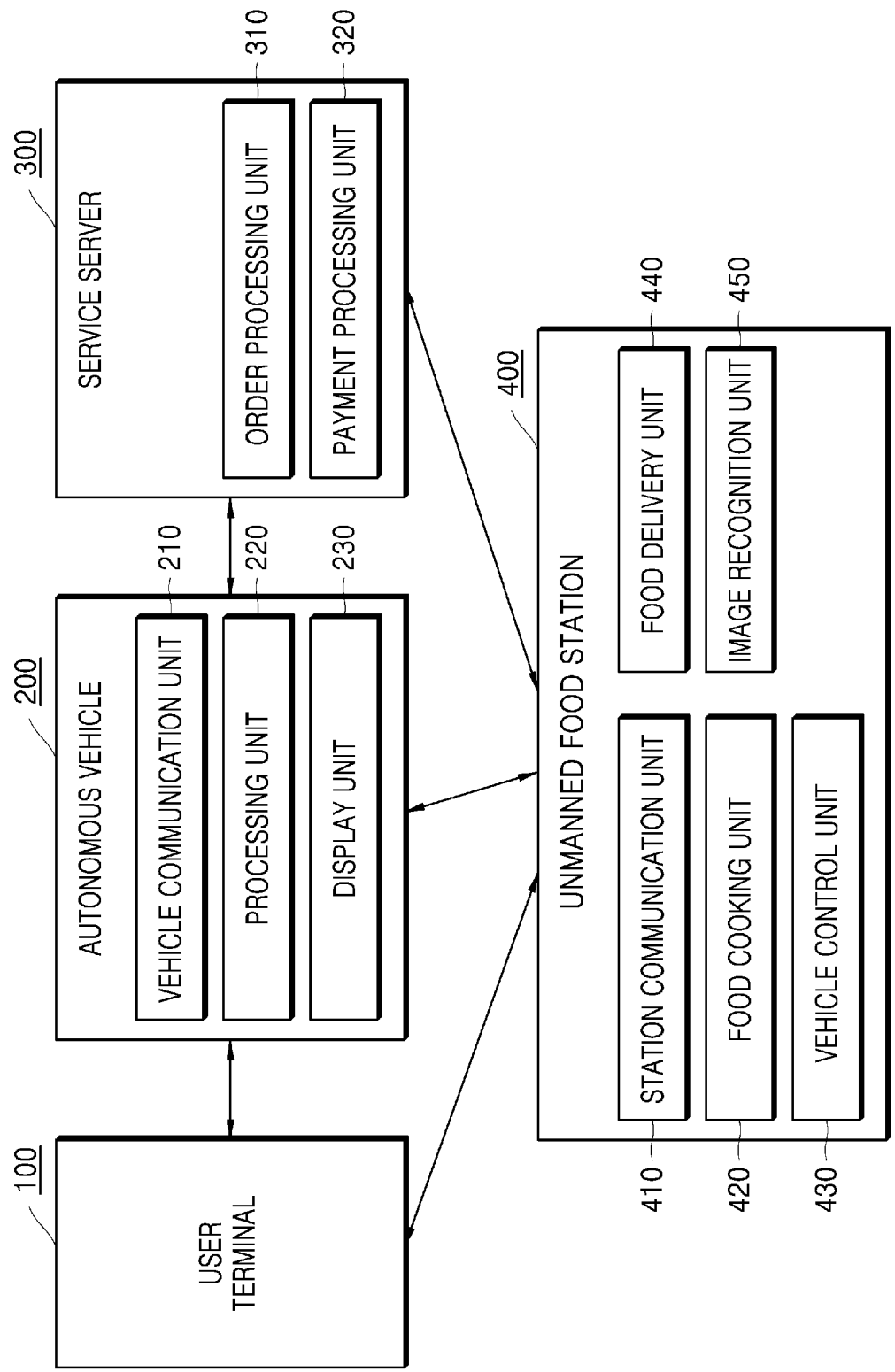
FIG. 1 is a block diagram illustrating the configuration of a system for ordering and delivering food by using an autonomous vehicle according to an embodiment of the present invention.

FIG. 1 is a block diagram illustrating the configuration of a system for ordering and delivering food by using an autonomous vehicle according to an embodiment of the present invention.

Referring to FIG. 1, the present system may include a user terminal 100, an autonomous vehicle 200, a service server 300, and an unmanned food station 400. If necessary, the present system may be configured without requiring the operation of the user terminal 100.

First, the user terminal 100 is configured to communicate with the autonomous vehicle 200, the service server 300, and the unmanned food station 400. The user terminal 100 may transmit the location information of the user terminal 100 or user-related information to the autonomous vehicle 200, the service server 300, and the unmanned food station 400. The user terminal 100 may be, e.g., any one of a smartphone, a tablet computer, a desktop computer, a laptop computer, a notebook computer, a workstation, a personal digital assistant (PDA), a portable computer, a wireless phone, a mobile phone, an e-book, a portable multimedia player (PMP), a portable game machine, a digital camera, a television, a wearable device, and an artificial intelligence (AI) speaker, and is not limited thereto.

The autonomous vehicle 200 may be a vehicle capable of driving on its own without the operation of a driver or a passenger, and may include a vehicle communication unit 210, a processing unit 220, and a display unit 230. In this case, the autonomous vehicle 200 may communicate with the user terminal 100, the service server 300, and the unmanned food station 400 via the vehicle communication unit 210 in a two-way manner. The vehicle communication unit 210 transmits and receives necessary information from the user terminal 100 such as, e.g., the service server 300, the unmanned food station 400, or a smartphone, or transmits acquired information to the service server 300, the unmanned food station 400, or the user terminal 100, in which case a wired/wireless network may be used.

In this case, when the network is a wireless communication network, it may include cellular communication or short-range communication. For example, cellular communication may include at least one of Long-Term Evolution (LTE), LTE Advanced (LTE-A), 5th Generation (5G), Code Division Multiple Access (CDMA), Wideband CDMA (WCDMA), Universal Mobile Telecommunications System (UMTS), WiBro (Wireless Broadband), and Global System for Mobile Communications (GSM). In addition, short-range communication may include at least one of Wireless Fidelity (Wi-Fi), Bluetooth, Zigbee, and Near Field Communication (NFC). However, the communication method is not limited thereto, and will include wireless communication technology to be developed in the future.

The processing unit 220 of the autonomous vehicle 200 is configured to execute various types of processing related to food ordering- and food delivery-related data processing, location information processing, autonomous driving control, the operation control of vehicle electric/electronic devices, and an authority change. For example, the processing unit 220 may include a central processing unit (CPU), an application processor (AP), or the like. The processing unit 220 may include memory capable of storing instructions or data related to at least one other component therein, or may access necessary information by communicating with a memory unit within the apparatus or, if necessary, an external memory.

A program or program modules included in the processing unit 220 may be configured in the form of an operating system, an application program, or a program, and may be physically stored in various types of widely used storage devices. The program or program modules may include various forms for performing one or more routines, subroutines, programs, objects, components, instructions, data structures, and specific tasks or executing a specific data type, and is not limited to these forms. For example, an app (application) related to the system for ordering and delivering food may be installed in the processing unit 220 of the autonomous vehicle 200. Through the installed app, the autonomous vehicle 200 may transmit and receive necessary data to and from the user terminal 100, the service server 300, and the unmanned food station 400, and may perform interaction.

The autonomous vehicle 200 may be configured to request a food order from the service server 300 through the voice or touch input of a user or input by the user terminal 100 via the processing unit 220. In this case, the closest unmanned food station 400 may be directly determined and then a food order may be requested based on the current location information of the autonomous vehicle 200. Alternatively, the unmanned food station 400 having the least current waiting time or being most suitable for selling the ordered food is determined among the unmanned food stations located within a predetermined distance via the service server 300, and an order may be requested from the corresponding unmanned food station 400 among a plurality of candidates. In addition, the autonomous vehicle 200 may transmit vehicle identification information such as vehicle license plate information and vehicle type information together with order information to the service server 300. Accordingly, the unmanned food station 400 may identify the corresponding vehicle through comparison with vehicle identification information upon arrival of the vehicle.

The autonomous vehicle 200 may be controlled so that it is moved to the determined unmanned food station 400, and may arrive at the unmanned food station 400 along an optimal driving route by taking into consideration traffic conditions and movement routes. In this case, the autonomous vehicle 200 may transmit expected arrival time to the corresponding unmanned food station 400 based on the traffic conditions and the movement route.

Furthermore, when a food order is placed through a plurality of unmanned food stations 400, the autonomous vehicle 200 may set an optimal driving route adapted to pass through the plurality of unmanned food stations 400 by taking into consideration the location of each unmanned food station and the cooking time of each item of ordered food.

Furthermore, the autonomous vehicle 200 may include a display unit 230, and display various types of information related to the system for ordering and delivering food-related apps through the display unit 230, so that the selection of the user can be input. In this case, the display unit 230 may be configured in the form of, e.g., a liquid crystal display (LCD), a light-emitting diode (LED) display, an organic light-emitting diode (OLED) display, a micro-LED, or a microelectromechanical system (MEMS) display, or a touch screen, and is not limited thereto. When the display unit 230 is configured in the form of a touch screen, a user input may be received through the user's touch on the display unit 230.

While communicating with the unmanned food station 400, the autonomous vehicle 200 performs, through the display unit 230, a window control-related information and control authority delegation display, a robot manual operation button display, a robot arm operation stop and return buttons display in case of a dangerous situation, a completion button display indicating that food has been delivered well, or a button display allowing a user to select a tip and pay the tip when the user is satisfied with the service of the robot of the unmanned food station 400. The autonomous vehicle 200 may interact with the unmanned food station 400 based on user input.

Next, the service server 300 performs various types of processing related to the operation of the system for ordering and delivering food by using an autonomous vehicle and an unmanned food station, and may include an order processing unit 310 and a payment processing unit 320.

The service server 300 may process order information received from the autonomous vehicle 200 or the user terminal 100 through the order processing unit 310. The order processing unit 310 is configured to determine a suitable unmanned food station based on the order information. For example, the order processing unit 310 may determine an unmanned food station closest to the autonomous vehicle 200 or the unmanned food station 400 reachable within the shortest time, may transmit order information to the determined unmanned food station 400, and may transmit information about the corresponding unmanned food station to the autonomous vehicle 200. Furthermore, when determining the unmanned food station 400, the unmanned food station 400 by which food will be prepared is determined based on at least one of the location of the autonomous vehicle 200, information related to the user such as the favorite shop and preferred shop of the user, and the state information of the unmanned food station such as the serving status of ordered food and waiting time information.

Furthermore, the service server 300 may perform the payment processing of the corresponding order through the payment processing unit 320 after the food ordered from the unmanned food station 400 to the autonomous vehicle 200 has been delivered. The payment completion information may be transmitted to the autonomous vehicle 200 or the user terminal 100.

The unmanned food station 400 may be configured to cook and prepare food, such as food and a beverage, based on the food order information received from the service server 300 and to deliver the prepared food into the autonomous vehicle 200 when the autonomous vehicle 200 arrives. The unmanned food station 400 may include a station communication unit 410, a food cooking unit 420, a vehicle control unit 430, a food delivery unit 440, and an image recognition unit 450.

The station communication unit 410 may be configured to communicate with the user terminal 100, the autonomous vehicle 200, and the service server 300 over a wired/wireless communication network.

The food cooking unit 420 may be configured to prepare food or a beverage ordered via one or more robot arms and cooking tools. For example, the food cooking unit 420 may be configured to prepare bread, coffee, rice dishes, noodle dishes, and the like. In addition, the food cooking unit 420 may determine a food cooking start time based on information such as the location and expected arrival time of the autonomous vehicle 200, the type of food ordered, the type and amount of pre-ordered food, and the current operating status of the unmanned food station 400, and may start cooking food at the corresponding time. For example, when an order request for two cups of drip coffee is received and the autonomous vehicle 200 departs from a distance of 10 minutes, preparing the corresponding ordered food may be started when the autonomous vehicle 200 is approximately 5 minutes away or 5 minutes before the expected arrival time based on 3 minutes, which is typically the time required to prepare two cups of drip coffee.

Furthermore, the food cooking unit 420 may determine the temperature of the food to prevent the food from cooling by taking into consideration the time it takes for the autonomous vehicle 200 in which the user is not riding to return to the user after receiving the food. For example, when the location of the user is 10 minutes away from the unmanned food station 400, it takes 10 minutes or more for the autonomous vehicle 200 to arrive at the user, so that the cooking temperature of the food may be increased to heat the food more than in the case where the user is 5 minutes away.

Furthermore, the food cooking unit 420 may determine a cooking start time for the food based on the schedule information of the user. For example, when the work time of the user starts at 10 o'clock and the distance between the workplace of the user and the unmanned food station 400 is about 10 minutes away, it may be possible to prepare the pre-ordered food around 9:30 and wait for the start of the work time of the user. In this case, it may also be possible to take into consideration traffic conditions at the time, and it may be possible to determine a cooking start time by determining that the probability of arriving after 9:30 is higher than the probability of arriving at 8:00 or 9:00 when traffic is heavy.

Furthermore, the food cooking unit 420 may change food cooking mode among a normal mode, a high-speed mode, and an ultrahigh-speed mode according to the food cooking speed based on the number of vehicles waiting in the unmanned food station 400 or a current order situation. For example, when orders pile up and there is no waiting vehicle, food cooking may be performed in the normal mode. When the number of waiting vehicles is equal to or larger than a predetermined reference and a number of food orders equal to or larger than a predetermined reference pile up, the mode of the food cooking unit 420 may be changed to the high-speed mode or ultrahigh-speed mode, and the movement speed of the robot and the food cooking speed may be changed to higher values.

Next, the vehicle control unit 430 may be configured to remotely control the autonomous vehicle 200 when the autonomous vehicle 200 arrives at the unmanned food station 400. Before delivering the food, prepared by the food delivery unit 440, into the autonomous vehicle 200, the vehicle control unit 430 makes it possible to safely and accurately deliver food by controlling the movement of the autonomous vehicle 200 and electric/electronic devices.

For example, when the autonomous vehicle 200 is located within a predetermined distance from the unmanned food station 400, it may be determined that the autonomous vehicle 200 has entered the area of the unmanned food station, and then the authority to control the movement of the autonomous vehicle 200 within the area of the unmanned food station may be first acquired through the vehicle control unit 430. Accordingly, the stopping location of the autonomous vehicle 200 may be appropriately controlled for food delivery by controlling the movement of the autonomous vehicle 200.

Next, the vehicle control unit 430 of the unmanned food station 400 may be configured to, if it is determined that the autonomous vehicle 200 is stopped at an appropriate location, acquire the authority to control the electric/electronic devices of the autonomous vehicle 200 and control components, such as windows, doors, a food tray, and an accommodation door, of the autonomous vehicle 200. Accordingly, a window located in a food delivery path may be controlled to be opened through the vehicle control unit 430 of the unmanned food station 400. For example, when there is a digital food tray or a controllable accommodation door, a corresponding component that can be a food destination may be controlled to be opened so that it becomes usable. In this case, for safety, the vehicle control unit 430 of the unmanned food station 400 may temporarily perform blocking control to block the vehicle operation of the user.

The food delivery unit 440 may include a robot arm configured to deliver prepared food into the autonomous vehicle 200, and may move the prepared food after the autonomous vehicle 200 has arrived and stopped. The food delivery unit 440 may return the robot arm to its original position after the delivery of the food is completed without a problem. At this time, delivery completion information may be transmitted to the autonomous vehicle 200 or the user terminal 100. In addition, payment processing may be performed through the payment processing unit 320 of the service server 300 at the same time that delivery is completed.

The unmanned food station 400 may also include the image recognition unit 450 configured to identify the window area and food delivery destination of the autonomous vehicle 200. The image recognition unit 450 may include a camera unit composed of at least one camera, and may determine the window area and food delivery destination of the corresponding vehicle by analyzing an image of the autonomous vehicle 200 photographed via the camera. After the autonomous vehicle 200 arrives, the unmanned food station 400 may activate the camera of the image recognition unit 450, may identify the window area or the food delivery destination area, and may deliver identified information to the food delivery unit 440. The food delivery unit 440 may safely and accurately perform food delivery by recognizing the window area and the food delivery destination. In addition, the image recognition unit 450 may receive and analyze an image photographed via a camera mounted on the robot arm of the food delivery unit 440.

Upon delivery of food through image analysis, the type of food, whether the user is riding, and/or the presence or absence of a dedicated food tray may be taken into consideration. For example, in the case of a coffee order, a coffee cup may be delivered to a cup holder in the vehicle, i.e., a food delivery destination, by the food delivery unit 440. When there is a dedicated food tray, food may be delivered in a predetermined form to the corresponding area.

As described above, according to the present invention, there may be provided the system that can prepare food by using the unmanned food station 400 in time for the arrival of the autonomous vehicle 200, thereby minimizing waiting time and delivering cooked food immediately.

Figure 2A:
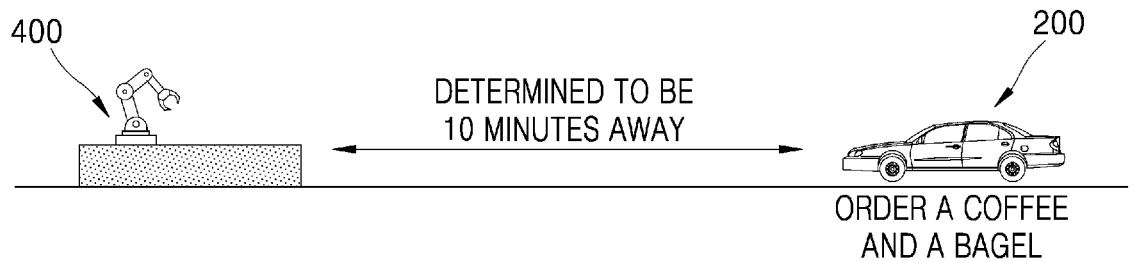
FIGS. 2a to 2c are exemplary views illustrating the operation of a system for ordering and delivering food by using an autonomous vehicle according to an embodiment of the present invention.
Figure 2B:
Figure 2C:

FIGS. 2a to 2c are exemplary views illustrating the operation of a system for ordering and delivering food by using an autonomous vehicle according to an embodiment of the present invention.

First, referring to FIG. 2a, the unmanned food station 400 may receive an order request for "a hand drip coffee and a bagel" from the autonomous vehicle 200, and may determine that the expected arrival time is 10 minutes after the current time by taking into consideration a physical distance and traffic conditions based on the current location of the autonomous vehicle 200.

Referring to FIG. 2b, when the autonomous vehicle 200 starts from a distance of 10 minutes, the food cooking unit 420 may be controlled such that it starts cooking the corresponding ordered food when the autonomous vehicle 200 is approximately 5 minutes away or 5 minutes before the expected arrival time based on, e.g., 3 minutes, which is the time required to prepare a bagel and a hand drip coffee.

Referring to FIG. 2c, the autonomous vehicle 200 may arrive in time for the food prepared by the food cooking unit 420 to come out, and the ordered bagel and hand drip coffee may be delivered to the autonomous vehicle 200 in an uncooled state and provided to the user without waiting time.

Figure 3A:
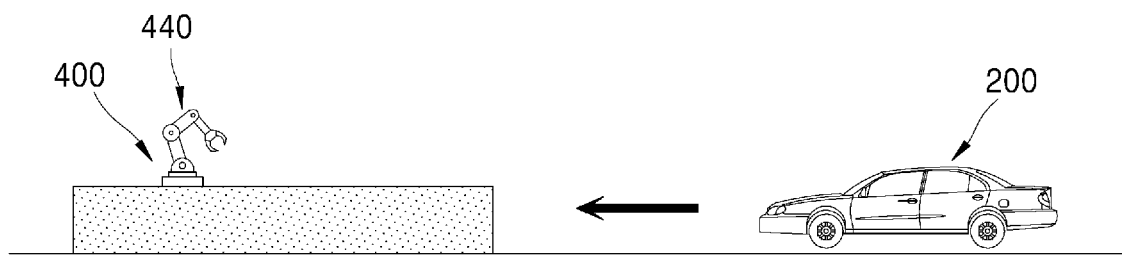
FIGS. 3a to 3c are exemplary views illustrating a configuration in which an unmanned food station acquires the authority to control an autonomous vehicle according to an embodiment of the present invention.
Figure 3B:
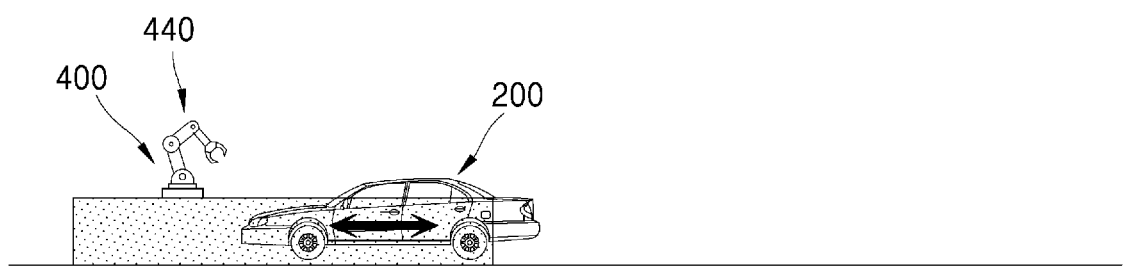
Figure 3C:
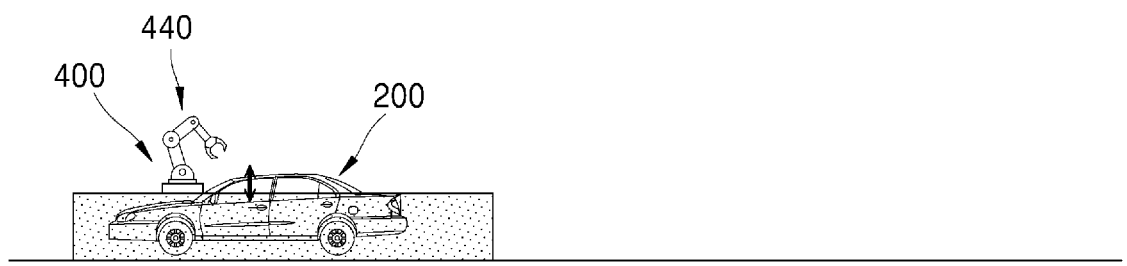

FIGS. 3a to 3c are exemplary views illustrating a configuration in which an unmanned food station acquires the authority to control an autonomous vehicle according to an embodiment of the present invention.

First, referring to FIG. 3a, when the autonomous vehicle 200 is located within a predetermined distance from the unmanned food station 400, it may be determined that the autonomous vehicle 200 has entered the area of the unmanned food station.

Referring to FIG. 3b, the vehicle control unit 430 of the unmanned food station 400 may acquire the authority to control the movement of the vehicle to remotely control the autonomous vehicle 200 after the autonomous vehicle 200 has entered the area of the unmanned food station. To this end, a setting may be made such that the autonomous vehicle 200 can transfer the authority to control the movement of the vehicle to the unmanned food station 400. Alternatively, a setting may be made such that the authority to control the movement of the vehicle can be acquired after the transfer of the authority to control the movement of the vehicle has been confirmed through user input in the user terminal 100 or the autonomous vehicle 200. In addition, as shown in FIG. 3b, a stopping position may be controlled while moving the autonomous vehicle 200 so that food can be delivered into the autonomous vehicle 200 via the food delivery unit 440.

Referring to FIG. 3c, after the autonomous vehicle 200 has been stopped at a position suitable for food delivery, the vehicle control unit 430 of the unmanned food station 400 may acquire the authority to control the electric/electronic devices of the autonomous vehicle 200 and autonomously control components, such as windows, doors, a food tray, and an accommodation door, of the autonomous vehicle 200. Accordingly, the window of a passenger seat located in a food delivery path is controlled to be opened through the vehicle control unit 430 of the unmanned food station 400. For example, when there is a digital food tray or a controllable storage door, the corresponding component that can be a food destination is controlled to be used. In this case, for safety, the vehicle control unit 430 of the unmanned food station 400 may perform blocking control to block the vehicle operation of the user and provide an alarm sound to the user.

Furthermore, although the unmanned food station 400 is shown as being stationary in the scenario of FIGS. 3a to 3c, the unmanned food station 400 may also be configured in a movable form. When the unmanned food station 400 is also configured in the form of a movable robot or vehicle, the unmanned food station 400 may control a food delivery operation by taking into consideration the distance from the autonomous vehicle 200 and the movement speed relative to each other. For example, when the unmanned food station 400 approaches the autonomous vehicle 200 by a distance within a predetermined reference, both the moving speeds of the unmanned food station 400 and the autonomous vehicle 200 may be changed to low speeds and the food may be delivered, or a parking lot may be searched for within a nearby area, the autonomous vehicle 200 may be stopped, and food may be delivered safely.

Figure 4:
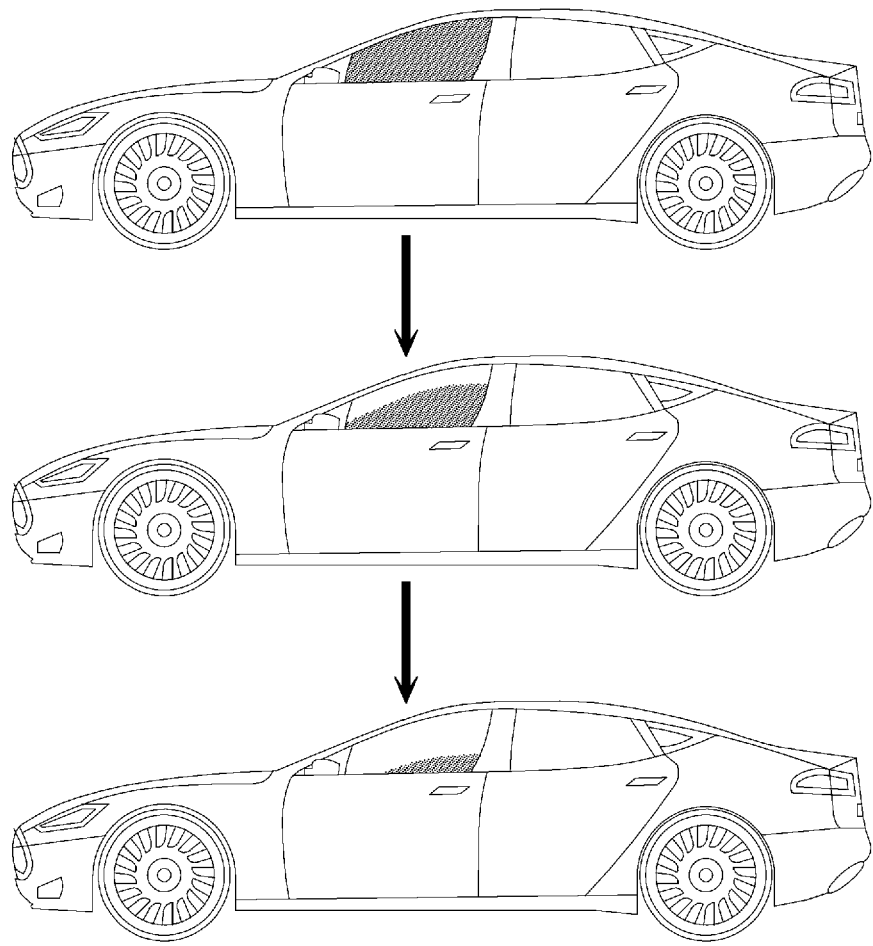
FIG. 4 is an exemplary diagram illustrating a configuration in which an unmanned food station controls a window of an autonomous vehicle according to an embodiment of the present invention.

FIG. 4 is an exemplary diagram illustrating a configuration in which an unmanned food station controls a window of an autonomous vehicle according to an embodiment of the present invention.

Referring to FIG. 4, it can be seen that the vehicle control unit 430 of the unmanned food station 400 acquires the authority to control the electric/electronic devices of the autonomous vehicle 200 and controls a window of the autonomous driving vehicle 200 as an example.

After the autonomous driving vehicle 200 has stopped in a food delivery area, the unmanned food station 400 may control and open a window located in a food delivery path through the vehicle control unit 430.

Figure 5A:
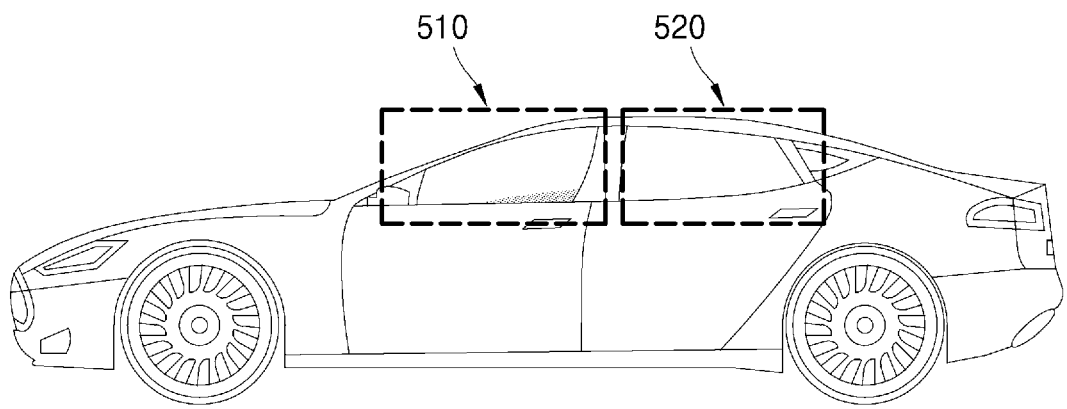
FIG. 5a is an exemplary diagram illustrating a configuration in which an unmanned food station according to an embodiment of the present invention recognizes window regions of an autonomous vehicle through image recognition.

FIG. 5a is an exemplary diagram illustrating a configuration in which an unmanned food station according to an embodiment of the present invention recognizes window regions of an autonomous vehicle through image recognition.

After the autonomous vehicle 200 arrives, the unmanned food station 400 may activate the camera of the image recognition unit 450 and identify window regions 510 and 520 of the corresponding vehicle. The front door window 510 or the rear door window 520 may be controlled and opened according to necessity or current situation.

Figure 5B:
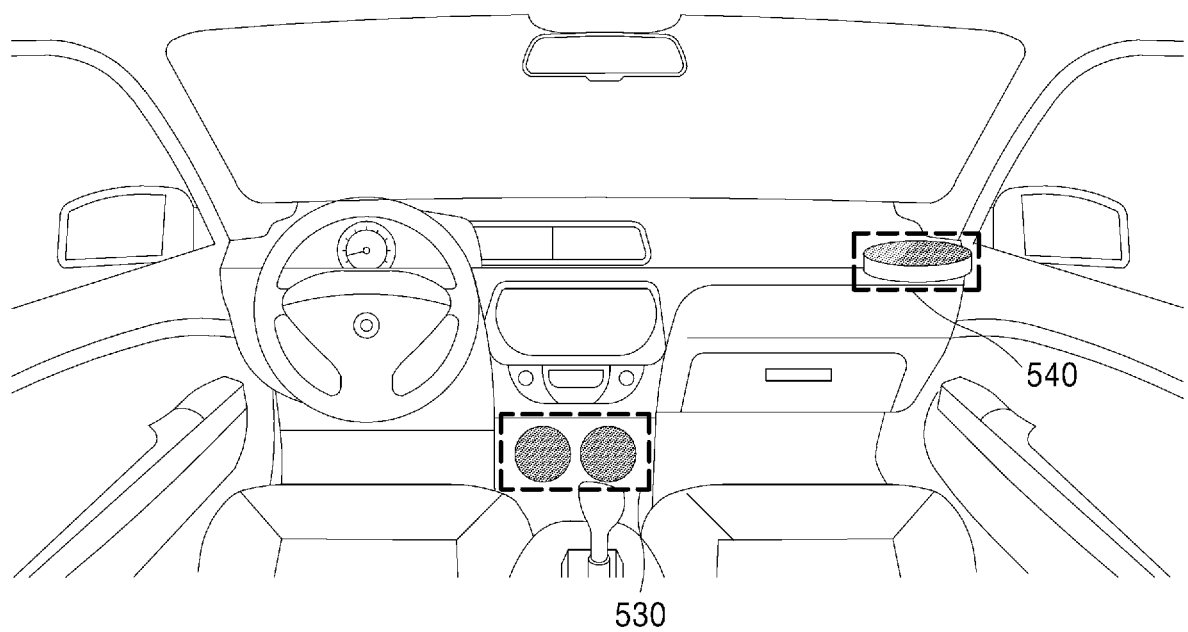
FIG. 5b is an exemplary diagram illustrating a configuration in which an unmanned food station according to an embodiment of the present invention identifies a food delivery destination in an autonomous vehicle through image recognition.

FIG. 5b is an exemplary diagram illustrating a configuration in which an unmanned food station according to an embodiment of the present invention identifies a food delivery destination in an autonomous vehicle through image recognition.

When the window is opened after the window regions 510 and 520 have been identified, the inside of the autonomous driving vehicle 200 may be photographed via the image recognition unit 450 of the unmanned food station 400 or the camera mounted on the robot arm of or the food delivery unit 440, and a food delivery destination may be identified. For example, the position of the cup holder 530 present between a driver's seat and a passenger seat may be identified, and, for example, in the case of a coffee order, a coffee cup may be safely delivered into the storage space of the cup holder 530 by the food delivery unit 440. In addition, when there is a dedicated food tray 540 positioned near the glove box of the passenger seat, ordered food may be delivered onto the dedicated food tray 540.

Furthermore, the food delivery destination may be determined by taking into consideration the location and characteristics of an occupant. For example, when the user is on the driver's seat, food may be delivered to the driver's seat so that the user can receive the food. When the user is on a rear seat, food may be delivered to the area of the rear seat. In addition, when there is a small child, hot food may be delivered as far away as possible from an area where the child is located, thereby increasing safety.

Furthermore, when there is a danger depending on the type of food, a safer destination may be selected in a more cautious manner. For example, hot coffee is more dangerous than iced coke, so that a safer area may be searched for and the hot coffee may be placed in a cautious manner.

Figure 6:
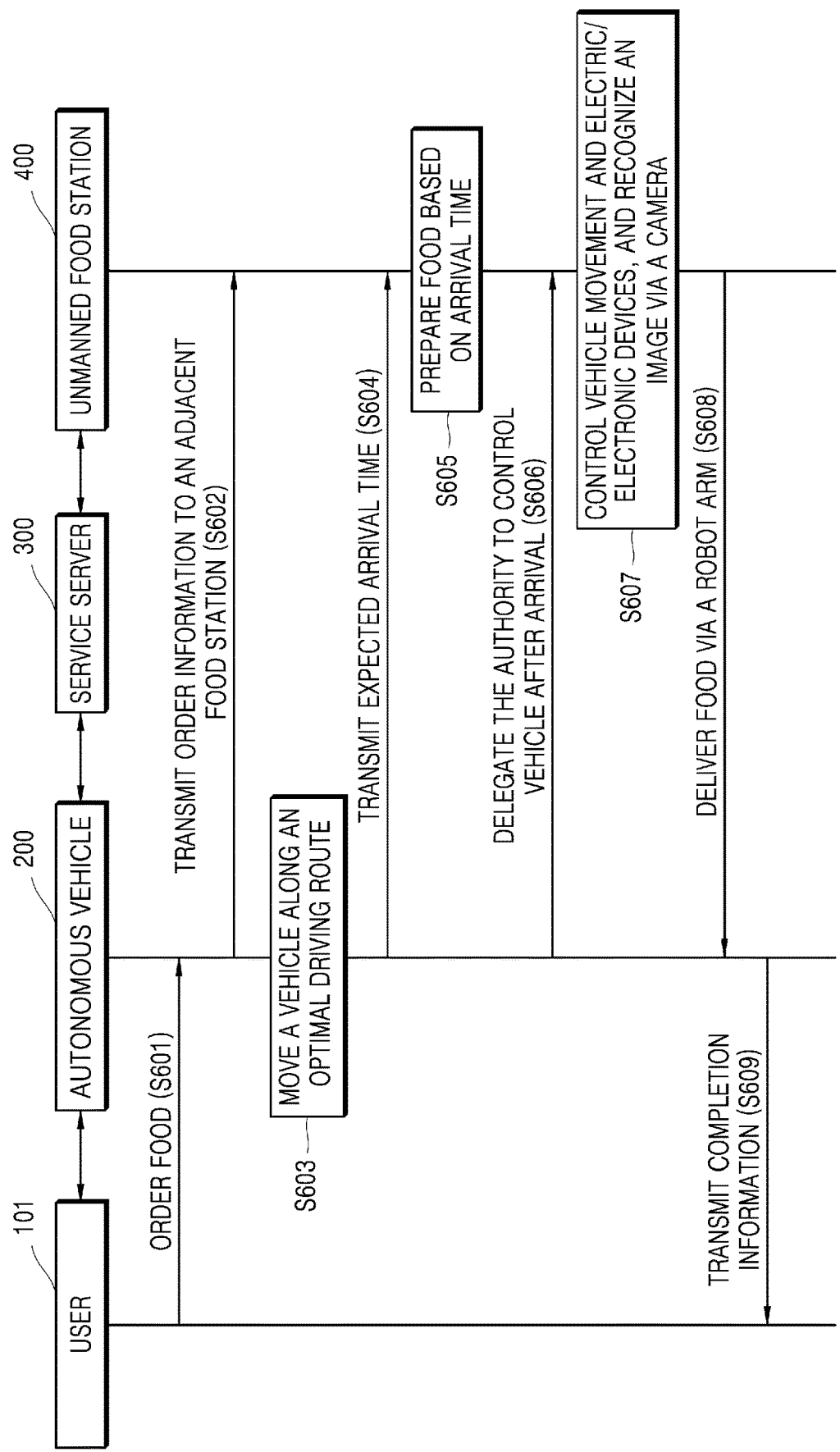
FIG. 6 is a flowchart illustrating a method of operating a system for ordering and delivering food according to an embodiment of the present invention.

FIG. 6 is a flowchart illustrating a method of operating a system for ordering and delivering food according to an embodiment of the present invention.

Referring to FIG. 6, the user 101 may order food from the autonomous vehicle 200 at step S601. For example, when the user 101 is in the autonomous vehicle 200, a food order may be placed through the autonomous vehicle 200 through a voice command, a touch input, or the like. When the user 101 is in a space other than the vehicle, a food order may be requested from the autonomous vehicle 200 through input via the user terminal.

The autonomous vehicle 200 may transmit order information together with vehicle information to the adjacent unmanned food station 400 through the service server 300 at step S602. In this case, in the determination of the unmanned food station 400 to cook ordered food, for example, the order information may be transmitted to the unmanned food station which is closest to the autonomous vehicle 200 or the unmanned food station at which the autonomous vehicle 200 can arrive within the shortest time. In addition, in the determination of the unmanned food station 400, an unmanned food station that will prepare food may be determined based on at least one of the location of the autonomous vehicle 200, information related to the user such as the favorite stop and preferred shop of the user, and the state information of the unmanned food station such as the serving status of ordered food and waiting time information.

After the food order has been placed, the autonomous vehicle 200 may be controlled to move along an optimal driving route by taking into consideration traffic conditions and/or the like at step S603

Furthermore, the expected arrival time of the autonomous vehicle 200 may be transmitted to the unmanned food station 400 based on the traffic conditions and the movement route at step S604. The expected arrival time may be periodically updated and transmitted. Alternatively, the unmanned food station 400 may determine the expected arrival time by receiving the location of the autonomous vehicle 200.

The unmanned food station 400 may prepare food based on the expected arrival time of the autonomous vehicle 200 at step S605. For example, when the coffee preparation time is 3 minutes, cooking may be started when the autonomous driving vehicle 200 is 5 minutes away with more than 3 minutes ensured.

When the autonomous vehicle 200 arrives at the area of the unmanned food station, the authority to control the vehicle may be delegated to the unmanned food station 400 at step S606.

The unmanned food station 400 may acquire the authority to control the vehicle, may control the movement and electric/electronic devices of the vehicle, and may also perform image recognition via the camera at step S607. The unmanned food station 400 may stop the vehicle 200 at a location suitable for food delivery, and may identify and determine window regions, a food destination area, etc. identified through image recognition.

The unmanned food station 400 may deliver the ordered food to a destination in the autonomous vehicle 200 through the robot arm of the food delivery unit 440 at step S608.

The autonomous vehicle 200 may transmit completion information to the user 101 after the food delivery has been completed at step S609. In this case, payment information may also be transmitted to the user 101.

Figure 7:
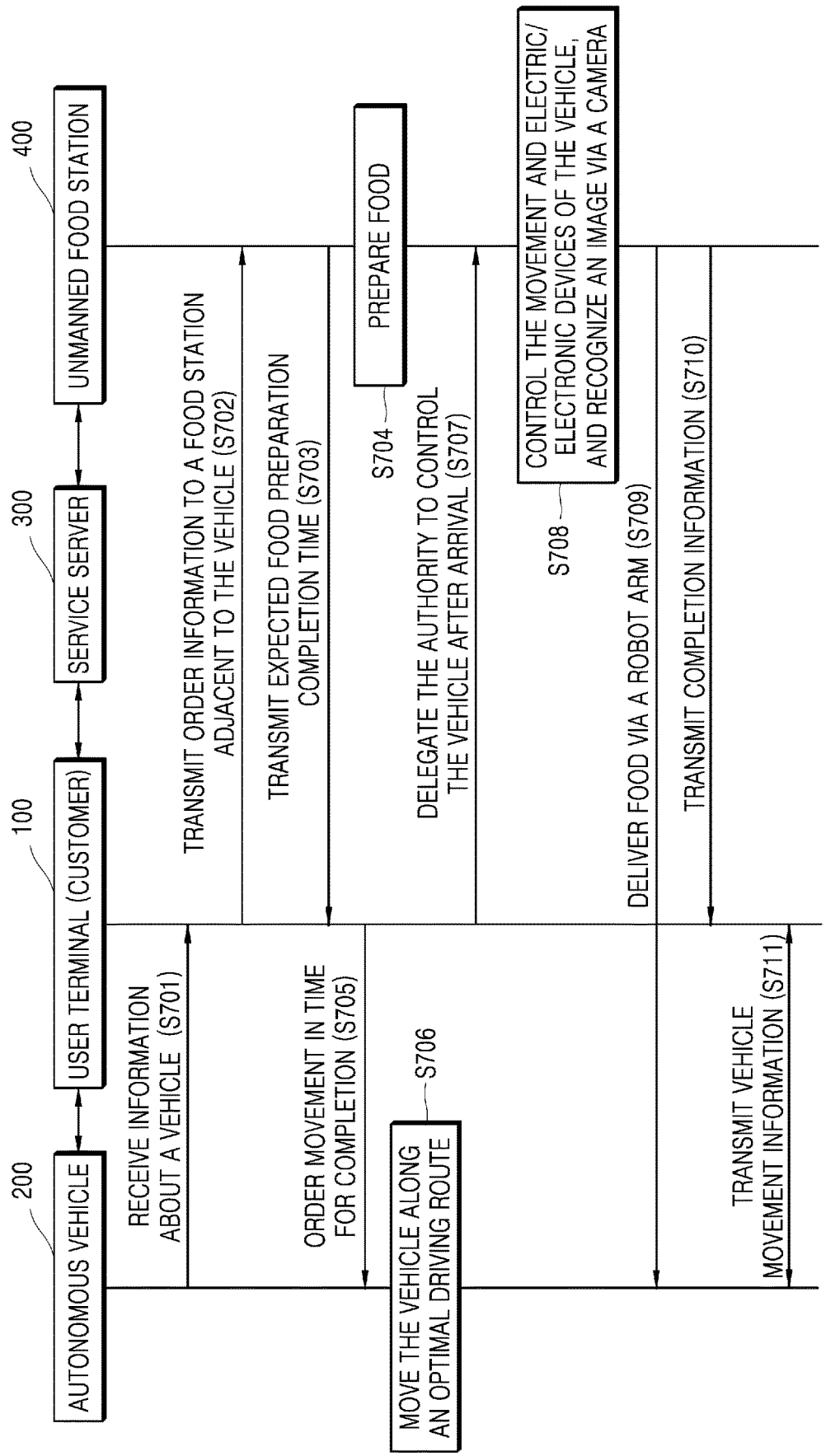
FIG. 7 is a flowchart illustrating a method of operating a system for ordering and delivering food according to another embodiment of the present invention.

FIG. 7 is a flowchart illustrating a method of operating a system for ordering and delivering food according to another embodiment of the present invention. FIG. 7 illustrates a case where the user terminal 100 serves as an intermediary control terminal between the autonomous vehicle 200 and the unmanned food station 400, unlike FIG. 6.

First, the user terminal 100 may receive vehicle information such as the current location of the vehicle from the autonomous vehicle 200 at step S701. The user terminal 100 may transmit order information to the food station 400 adjacent to the vehicle at step S702. In this case, pieces of vehicle-related information such as the current location of the vehicle and identification information may be transmitted to the unmanned food station 400 together.

The unmanned food station 400 may determine expected food preparation completion time and transmit it to the user terminal 100 at step S703.

The unmanned food station 400 may prepare the ordered food and start cooking at an appropriate time at step S704.

The user terminal 100 may instruct the autonomous vehicle 200 to move to the unmanned food station 400 in time for the expected food preparation completion time at step S705.

The autonomous vehicle 200 may arrive at the unmanned food station 400 by moving along an optimal driving route at step S706.

After the vehicle has arrived, the authority to control the autonomous vehicle 200 may be delegated to the unmanned food station 400 through the confirmation of the user terminal at step S707.

After acquiring the authority to control the vehicle, the unmanned food station 400 may control the movement and electric/electronic devices of the vehicle and determine a food delivery destination through image recognition via the camera at step S708.

The unmanned food station 400 may deliver food into the autonomous vehicle 200 via the robot arm at step S709.

The unmanned food station 400 may transmit food delivery completion information to the user terminal 100 at step S710. In addition, after receiving the food, the autonomous vehicle 200 transmits vehicle movement information to the user terminal 100 while moving to the user at step S711.

Although the systems for ordering and delivering food by using an autonomous vehicle according to the embodiments of the present invention have been described as various specific embodiments, this is merely an example. The present invention is not limited thereto, and should be construed as having the widest scope according to the basic spirit disclosed herein. Those skilled in the art may implement a pattern of a shape not specified by combining or substituting the disclosed embodiments, but this also does not depart from the scope of the present invention. In addition, those skilled in the art may easily change or modify the embodiments disclosed based on the present specification, and it is obvious that such changes or modifications also fall within the scope of the present invention.

The invention claimed is:

1. A method for ordering and delivering food by using an autonomous vehicle, the method comprising:
    a food ordering step of transmitting an order of food by a user to a server, information on the order of food not designating a food station to receive the order of food;
    an unmanned food station determination step of determining, by the server, an unmanned food station that will prepare the food among a plurality of unmanned food stations based on a location of the autonomous vehicle, and transmitting, by the server, the order of food to the determined unmanned food station;
    a vehicle movement step of controlling an autonomous vehicle to move to the determined unmanned food station;
    a food preparation step of preparing, by the determined unmanned food station, ordered food;
    a vehicle entry step of recognizing that the autonomous vehicle has entered an area of the unmanned food station in response to determining that the autonomous vehicle is located within a predetermined distance from the unmanned food station;
    a control delegation step of delegating, by the autonomous vehicle, control of the autonomous vehicle to the determined unmanned food station;
    a vehicle control step of controlling, by the determined unmanned food station, movement of the autonomous vehicle remotely in response to receiving delegation of the control of the autonomous vehicle from the autonomous vehicle; and a food delivery step of delivering, by the determined unmanned food station, the prepared food into the autonomous vehicle.

2. The method of claim 1, wherein the food ordering step comprises ordering, by the autonomous vehicle, the food from the server based on food order information received from the user.

3. The method of claim 1, wherein the unmanned food station determination step comprises determining an unmanned food station closest to the autonomous vehicle.

4. The method of claim 1, wherein the unmanned food station determination step comprises determining an unmanned food station to prepare food based on at least one of information related to the user, and state information of the unmanned food station.

5. The method of claim 1, wherein the vehicle movement step comprises receiving expected food preparation completion time received from the unmanned food station, and
controlling vehicle movement based on the expected food preparation completion time.

6. The method of claim 1, further comprising transmitting expected arrival time for the autonomous vehicle to arrive at the determined unmanned food station to the unmanned food station;
wherein the food preparation step comprises preparing the ordered food based on the expected arrival time.

7. The method of claim 1, wherein the food preparation step comprises determining cooking start time of the ordered food based on expected arrival time of the autonomous vehicle and cooking time of the ordered food.

8. The method of claim 1, further comprising transmitting location information of a terminal of the user to the server;
wherein the food preparation step comprises determining temperature of the food based on expected time of arrival of the food to the user.

9. The method of claim 1, further comprising a vehicle control step of remotely controlling, by the unmanned food station, the autonomous vehicle;
wherein the vehicle control step comprises:
acquiring, by the determined unmanned food station, an authority to control electric/electronic devices of the autonomous vehicle within an area of the unmanned food station; and
opening, by the determined unmanned food station, a window of the autonomous vehicle.

10. The method of claim 1, further comprising a vehicle control step of remotely controlling, by the unmanned food station, the autonomous vehicle;
wherein the vehicle control step comprises acquiring an authority to control electric/electronic devices of the autonomous vehicle within an area of the unmanned food station; and
wherein the food delivery step further comprises blocking vehicle control by a driver or passenger of the autonomous vehicle.

11. The method of claim 1, further comprising activating, by the unmanned food station, a camera configured to photograph the autonomous vehicle within an area of the unmanned food station;
wherein the food delivery step comprises delivering the prepared food to a destination within the autonomous vehicle determined based on image recognition via the camera.

12. The method of claim 11, wherein the food delivery step comprises determining a location of a window of the autonomous vehicle, determining whether the window is open, and delivering the ordered food through an open space of the window.

13. The method of claim 11, wherein the food delivery step comprises determining whether a driver or passenger is present in the autonomous vehicle, and determining a delivery destination of the ordered food based on a location of the driver or passenger.

14. The method of claim 11, wherein the food delivery step comprises determining a delivery destination of the ordered food based on an attribute of the ordered food.

15. The method of claim 1, wherein the food delivery step comprises gripping and delivering, by a robot arm included in the unmanned food station, the ordered food.

16. The method of claim 1, further comprising transmitting, by the server, food delivery completion information and payment information after the ordered food has been delivered into the autonomous vehicle.

17. The method of claim 1, further comprising moving, by the autonomous driving vehicle, based on a location of the user after receiving the ordered food.

18. A system for ordering and delivering food using an autonomous vehicle, the system comprising:
an autonomous vehicle configured to transmit an order of food by a user to a server, information on the order of food not designating a food station to receive the order of food;
the server configured to:
receive information about the order of food by the user;
determine an unmanned food station to prepare the food among a plurality of unmanned food stations based on a location of the autonomous vehicle; and
transmit the order of food to the determined unmanned food station; and
the determined unmanned food station configured to:
prepare the food based on the information about the food order and to deliver the prepared food into the autonomous vehicle when the autonomous vehicle arrives;
receive delegation of control of the autonomous vehicle from the autonomous vehicle when the autonomous vehicle is located within a predetermined distance from the unmanned food station; and
control movement of the autonomous vehicle remotely in response to receiving the delegation of the control of the autonomous vehicle.

19. The system of claim 18, wherein the determined unmanned food station comprises a vehicle control unit configured to remotely control the autonomous vehicle in response to the autonomous vehicle being located within a predetermined distance from the unmanned food station.

20. The method of claim 1, wherein in the unmanned food station determination step, the unmanned food station that will prepare the food is determined among a plurality of unmanned food stations further based on a favorite stop of the user and waiting time information related to the plurality of unmanned food stations.

* * * * *